(12) United States Patent
Murokita et al.

(10) Patent No.: US 7,496,462 B2
(45) Date of Patent: Feb. 24, 2009

(54) ENCODING SIGNAL PROCESSING DEVICE AND SIGNAL PROCESSING METHOD THEREFOR

(75) Inventors: Ikuma Murokita, Fukuoka (JP); Takefumi Kabashima, Fukuoka (JP); Yuji Arinaga, Fukuoka (JP); Yasushi Yoshida, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 11/665,965

(22) PCT Filed: Sep. 29, 2005

(86) PCT No.: PCT/JP2005/017960

§ 371 (c)(1),
(2), (4) Date: Jun. 6, 2007

(87) PCT Pub. No.: WO2006/043403

PCT Pub. Date: Apr. 27, 2006

(65) Prior Publication Data

US 2008/0117992 A1    May 22, 2008

(30) Foreign Application Priority Data

Oct. 20, 2004    (JP)    ............................... 2004-306102

(51) Int. Cl.
*H03M 1/12* (2006.01)

(52) U.S. Cl. .................. 702/90; 341/111; 341/116; 714/776; 714/753; 714/758

(58) Field of Classification Search ................... 702/90; 341/111, 116; 714/776, 753, 758
See application file for complete search history.

(56) References Cited

U.S. PATENT DOCUMENTS

| 4,809,274 | A | * | 2/1989 | Walker et al. | ................ 714/776 |
| 5,663,643 | A | * | 9/1997 | Matuyama | ............. 324/207.12 |
| 6,188,341 | B1 | * | 2/2001 | Taniguchi et al. | ........... 341/116 |

FOREIGN PATENT DOCUMENTS

| JP | 63-256814 A | 10/1988 |
| JP | 08-101045 A | 4/1996 |
| JP | 2002-286508 A | 10/2002 |
| JP | 2003-254785 A | 9/2003 |
| WO | WO 98/21553 A1 | 5/1998 |

* cited by examiner

*Primary Examiner*—Michael P. Nghiem
*Assistant Examiner*—Hien X Vo
(74) *Attorney, Agent, or Firm*—Sughrue Mion, PLLC

(57) ABSTRACT

An encoder signal processing device comprising an A/D converter converting a periodic analog signal, a memory storing position detection error information and a computing unit including a position data calculator which calculates position data from the digital data and an error correcting section which corrects the position data based on the position detection error information. The memory includes a first memory encoding position error data which is included in the position data by the use of the computing unit and storing a correction coefficient. A second memory decoding the position error data on the basis of the correction coefficient by the use of the computing unit and storing correction data for correcting the position data and error-containing position data generated on the basis of the encoded position error data.

11 Claims, 12 Drawing Sheets

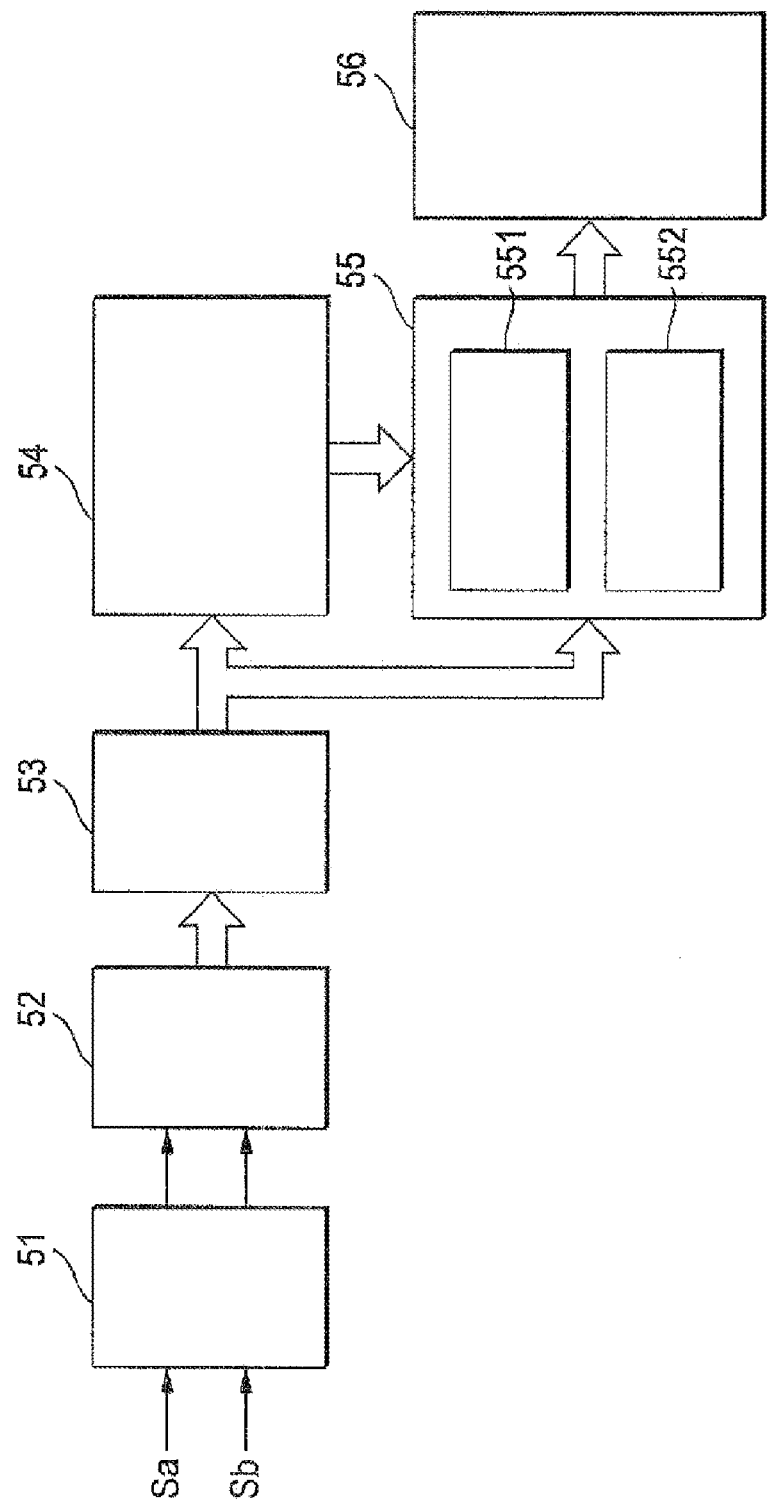

US 7,496,462 B2

ENCODING SIGNAL PROCESSING DEVICE AND SIGNAL PROCESSING METHOD THEREFOR

TECHNICAL FIELD

The present invention relates to a signal processing device of an encoder such as a linear encoder for detecting displacement of a linear stage or the like and a rotary encoder for detecting a rotation angle of a rotating object such as a motor, and a signal processing method therefor.

BACKGROUND ART

Up to date, it is well known that encoder processing devices, storing memory by previously calculating a position detection error generated by an offset voltage, an amplitude error, a wave distortion, and the like which are characteristics of two-phase analog signals obtained from a sensor signal detecting section, and correcting the position detection signal on the basis of the detection error data in the process of an usual position detection (For example, refer to patent document 1).

FIG. 12 is a block diagram illustrating a configuration of the known encoder processing device.

In FIG. 12, 51 indicates an analog amplifier amplifying two-phase analog signals Sa and Sb which are obtained from a sensor signal detecting section. 52 indicates an analog-digital converter converting the amplified two-phase analog signals to digital signals. 53 indicates a digital interpolation circuit converting the converted two-phase digital signals to position data. 54 indicates a detection error data calculator receiving the position data from the digital interpolation circuit 53 and calculating detection error data for the correction. 55 indicates a detection error correction circuit correcting detection error of the position data by the use of the detection error data for the correction and including a detection error storing register 551 for the correction and a correction calculator 552. 56 indicates a position data generator generating the position data which has a plurality of cycles from the corrected position data in one cycle and the number of cycles of an original signal.

It will be described about an operation of the known device in the next.

First, methods of an error data calculation and storage thereof will be described. Objects which are targets for a measurement and not illustrated are moved at a constant velocity. The two-phase analog signals Sa and Sb which can be obtained from the sensor signal detecting section are amplified by the analog amplifier 51 and are converted into digital data by analog-digital converter 52. Then, the signals are converted into the position data by the digital interpolation circuit 53.

Two objects are moved at the constant velocity, and the movement distance of the one cycle is previously measured. Accordingly, by sampling the distance in the one cycle at equal intervals, the movement distance can be calculated in each sampling process. The detection error data calculator 54 calculates the position error from ideal position data which is obtained by the calculation and the position data which is detected in the process of the sampling. The calculator stores the position error data in the detection error storing register 551 for the correction in the detection error correction circuit 55.

Second, it will be described about a method correcting the position data by using the stored position error data. In the usual process of detecting the position, the position data is calculated on the basis of the two-phase analog signals which can be obtained from the sensor signal detecting section. Then, the correction calculator 552 corrects the detection error of the position data by the use of the detection error data which is stored in the detection error storing register 551 for the correction. As a result, the calculator gives an output to the position data generator 56.

As mentioned above, the known encoder signal processing devices store the position error data corresponding to the detection position in the detection error storing register for the correction. The known devices also correct the detection error of the position data by the use of the position error data.

Patent Document 1: Japanese Unexamined Patent Application Publication No. 2003-254785 (refer to page 10 and FIG. 2)

DISCLOSURE OF THE INVENTION

Problems to be Solved by the Invention

However, the known encoder position calculator stores the position error data with respect to the detection position in the memory and performs the correction on the basis of the data. Therefore, to correct even a high order distortion error and improve accuracy thereof, it may be required to increase the number of the position error data by minutely partitioning the position error data in the one cycle of the analog signal. As a result, there are problems that a large memory is required, and the device size increases. There is also a problem that a program for the device is more complicated, and the signal processing circuit becomes larger.

Accordingly, the present invention is contrived in consideration of these problems. It is an object to provide an encoder signal processing device and a method therefor that the large memory is not required and even the high order distortion can be corrected by a simple signal processing circuit and method.

Means for Solving the Problems

To solve the problem mentioned above, the invention is configured as below.

According to claim 1, there is provided an encoder signal processing device including:

an A/D converter converting a periodic analog signal, which is obtained from a sensor signal detecting section, into digital data, with relative displacement of two objects;

a memory storing position detection error information; and a computing unit including a position data calculator which calculates position data from the digital data and an error correcting section which corrects the position data based on the position detection error information, wherein the memory includes:

a first memory encoding position error data which is included in the position data by the use of the computing unit and storing a correction coefficient; and a second memory decoding the position error data on the basis of the correction coefficient by the use of the computing unit and storing correction data for correcting the position data and error-containing position data generated on the basis of the encoded position error data.

According to claim 2, there is provided the encoder signal processing device, wherein the first memory includes a non volatile memory, and the second memory includes a volatile memory.

According to claim 3, there is provided the encoder signal processing device, wherein the calculator includes:

an error-correction parameter acquiring section calculating the correction coefficient;

an error-containing position data preparing section preparing the error-containing position data based on the encoded position error data; and an error-correction position table preparing section preparing a table of correction data corresponding to the error-containing position data.

According to claim 4, there is provided a signal processing method of an encoder signal processing device, the method including:

a position error storing step of moving two objects relative to each other at a constant velocity, converting a periodic analog signal generated in accordance with relative displacement into digital data, calculating position data from the digital data, calculating position error data from the position data, and storing the position error data; and a position error correcting step of correcting the position data on the basis of the stored position error data, wherein the position error data stored in the position error storing step is obtained by generating a correction coefficient encoding the calculated position error data and storing the correction coefficient in a first memory, and the position error correcting step includes;

reading and decoding the correction coefficient stored in the first memory, calculating error-containing position data from the decoded position error data, preparing a correction table in which the error-containing position data is correlated with correction data, storing the correction table in a second memory, converting a periodic analog signal generated with displacement into digital data at the time of detecting the relative displacement of the two objects, calculating position data from the digital data, reading the correction data stored in the second memory, correcting the position data by the use of the correction data, and outputting the corrected position data.

According to claim 5, there is provided the signal processing method of an encoder signal processing device according to claim 4, wherein the position error data stored in the position error storing step is obtained by storing in the first memory a correction coefficient, which is obtained by repeating plural times steps of:

correcting the position data on the basis of the stored correction data, calculating the position error data from the corrected position data, generating the correction coefficient encoding the position error data, storing the correction coefficient in the first memory, reading and decoding the correction coefficient stored in the first memory, calculating error-containing position data from the decoded position error data, preparing a correction table in which the error-containing position data is correlated with correction data, storing the correction table in the second memory, correcting the position data on the basis of the correction data, calculating the position error data from the corrected position data, and updating the coefficient of the last time as the correction coefficient of the present time encoding the position error data.

According to claim 6, there is provided the signal processing method, wherein the correction coefficient includes:

an amplitude of a plural order COS component, and an amplitude of a plural order SIN component processed by a Fourier transform.

According to claim 7, there is provided the signal processing method of an encoder signal processing device, wherein the correction coefficient includes:

an amplitude and a phase of a plural order COS or SIN component processed by a Fourier transform.

According to claim 8, there is provided the signal processing method of an encoder signal processing device, wherein the correction data includes the decoded position error data, the position error data corresponding to the position data is obtained from the correction table, and the corrected position data obtained by subtracting the position error data from the position data is outputted.

According to claim 9, there is provided the signal processing method of an encoder signal processing device, wherein the correction data includes ideal position data, the ideal position data corresponding to the position data is obtained from the correction table, and the corrected position data is outputted by outputting the ideal position data.

According to claim 10, there is provided the signal processing method of an encoder signal processing device, wherein a feedback velocity controlled system is configured by the use of the corrected position data, and the two objects are made to move relative to each other at a constant velocity.

According to claim 11, there is provided the signal processing method of an encoder signal processing device, wherein one of the two objects displaced relative to each other is mechanically connected to a moving object which is controlled at a constant velocity, and the two objects are made to move relative to each other at a constant velocity.

Effects of the Invention

An encoder device of the invention encodes detection error information and stores the encoded information. Therefore, a large memory is not required, and even a high order distortion error can be corrected by a simple processing circuit. As a result, it is possible to obtain a position detection signal having high accuracy.

When the device uses a non volatile memory as a memory storing a correction coefficient and a volatile memory as a means storing correction data, an operation deriving the correction coefficient is not required as applying a power source, and only the correction data is generated. Therefore, the operation becomes simple.

Since the detection error information is encoded, the data in processes may be of small number, and even a high order distortion error can be corrected by a simple program.

There is also advantage that a large scale device equipped with a high resolution encoder and the like is not required when a feedback velocity controlled system is configured by the use of an output from the encoder signal processing device itself and a constant velocity is obtained.

When a target object for a measurement is mechanically connected to the moving object and the constant velocity is obtained, it is possible to perform a high velocity control in higher accuracy. Therefore, it is possible to obtain the position error data in acceptable accuracy.

BRIEF DESCRIPTION OF THE DRAWINGS

FIG. 12 is a block diagram illustrating a configuration of the known encoder signal processing device.

DESCRIPTION OF REFERENCE NUMERALS AND SIGNS

1: A/D CONVERTER
2: POSITION DATA CALCULATOR
3: ERROR-CORRECTION PARAMETER ACQUIRING SECTION
4: FIRST MEMORY
5: ERROR-CONTAINING POSITION DATA PREPARING SECTION
6: ERROR-CORRECTION POSITION TABLE PREPARING SECTION
7: SECOND MEMORY
8: ERROR CORRECTING SECTION
9: COMPUTING UNIT

BEST MODE OR CARRYING OUT THE INVENTION

Hereinafter, it will be described about embodiments of the invention with reference to drawings.

First Embodiment

Figure 1:
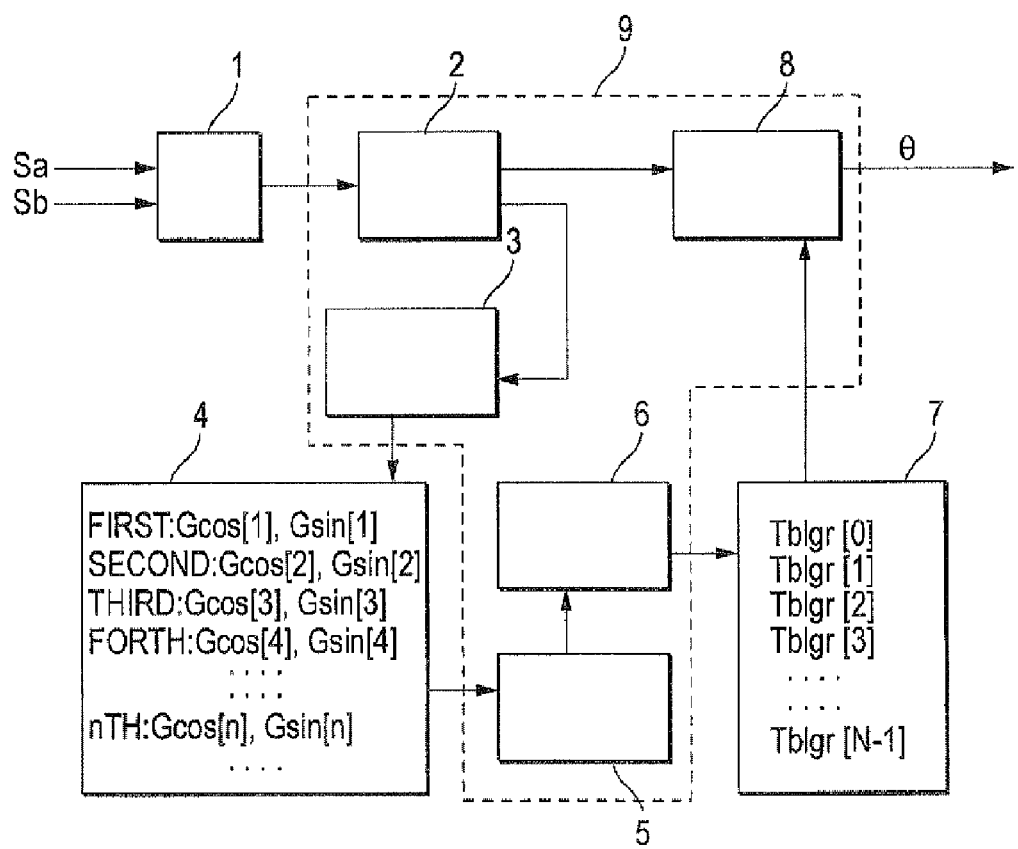
FIG. 1 is a block diagram illustrating a configuration of an encoder signal processing device according to the invention.

FIG. 1 is a block diagram illustrating a configuration of an encoder signal processing device according to the invention.

In FIG. 1, 1 indicates an A/D converter converting periodic analog signals Sa and Sb, which is obtained from a sensor signal detecting section, into digital data, with relative displacement of two objects. 2 indicates a position data calculator which calculates position data from the two phase digital data. 3 indicates an error-correction parameter acquiring section encoding position error data which is included in the position data and calculating the correction coefficient. 4 indicates a first memory storing the correction coefficient. 5 indicates an error-containing position data preparing section which reads out the correction coefficient from the first memory, encodes the position error data, and prepares the error-containing position data based on the encoded position error data. 6 indicates an error error-correction position table preparing section preparing a correction table corresponding to correction data for correcting the error-containing position data and the position data. 7 indicates a second memory storing the correction table. 8 indicates an error correcting section correcting the position data. 9 indicates a computing unit including the position data calculator 2, the error-correction parameter acquiring section 3, the error-containing position data preparing section 5, the error-correction position table preparing section 6, and the error correcting section 8.

The sensor signal detecting section may use a detecting section of a linear encoder as the sensor signal detecting section when two objects are relatively displaced in a linear direction. Alternatively, the sensor signal detecting section may use a detecting section of a rotary encoder as the sensor signal detecting section when the two objects are relatively displaced in a rotational direction. It is no matter that which method of a magnetic system, an optic system, a capacitor system, a resolver system, or the like is used as a detection principal of the sensor signal detecting section if variation of analog signals occurs in accordance with relative displacement.

Additionally, it is no matter that a signal amplifying circuit such as computing amplifier is disposed on the A/D converter 2.

The computing unit 9 may be configured to use singular or plural number of several kinds of devices such as a micro computer and DSP which have a function of a digital computing.

The first memory 4 is allowed to be integrated in the computing unit 9 or the second memory 7. Preferably, the first memory 4 using a ROM, a flash memory, or the like is better.

The second memory 7 is also allowed to be integrated in the computing unit 9 or the first memory 4. It is no matter whether the second memory 7 is a volatile memory or a non volatile memory.

In the following description, it will be described about operations of the encoder signal processing device according to the invention.

The operations of the invention can be defined as three operations.

A first operation is a position error storing step (an operation generating a correction coefficient) which encodes the position error data and stores the correction coefficient to the first memory.

A second operation is an operation (an operation preparing a correction table) which decodes the position error data stored in the first memory, prepares the correction table ahead of drive, and stores the second memory in a position error correcting step.

A third operation is an operation (a correcting operation) which reads out the correction data from the correction table in the process of actual drive, and corrects the position data in the position error correcting step.

Hereinafter, these operations will be sequentially described.

(Correction Coefficient Preparing Operation)

First, the operation generating the correction coefficient will be described.

Figure 2:
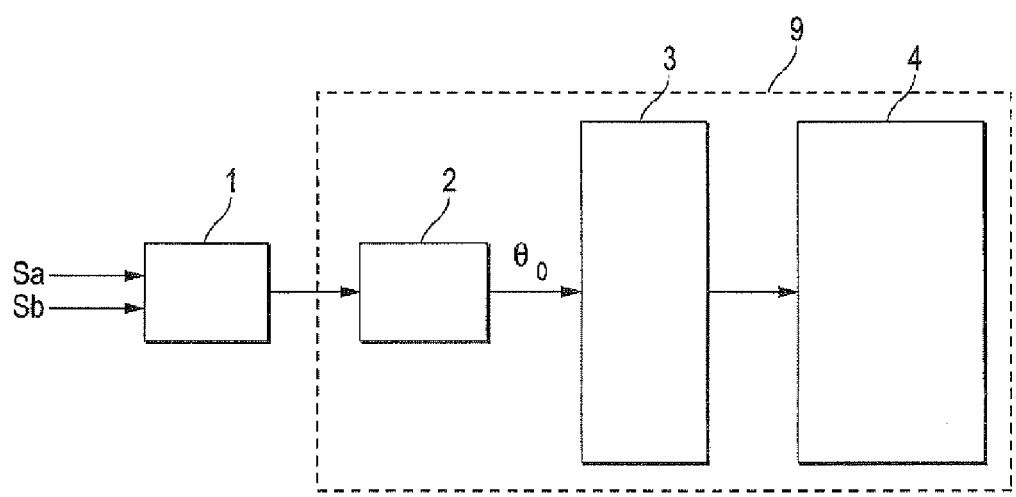
FIG. 2 is a block diagram illustrating an operation generating a correction coefficient.
Figure 3:
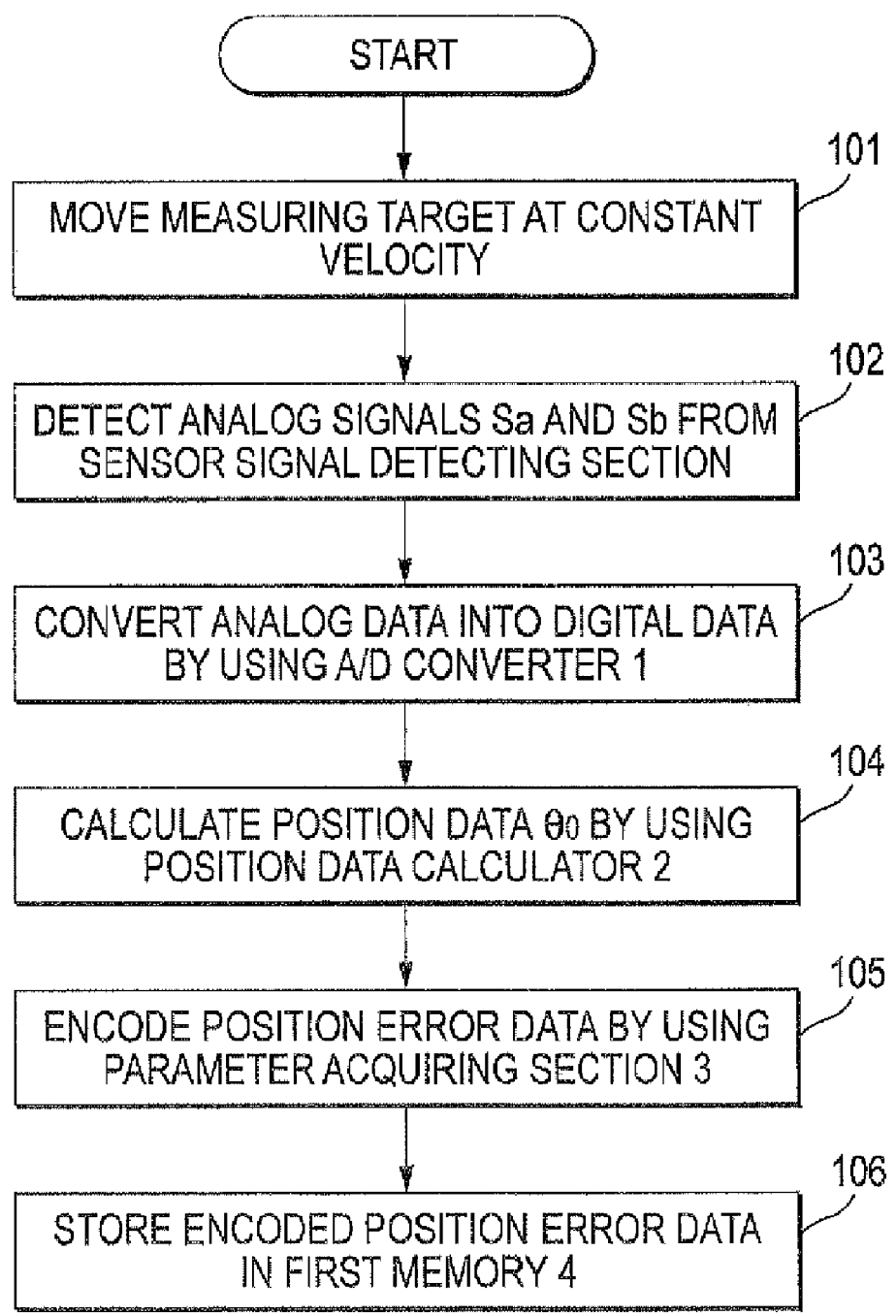
FIG. 3 is a flowchart illustrating an operation preparing a correction coefficient.

FIG. 2 is a block diagram illustrating the operation generating the correction coefficient. FIG. 2 is a drawing extracting a part relating to the operation generating the correction coefficient from the block diagram of the signal processing device in FIG. 1. FIG. 3 is a flowchart illustrating an operation preparing the correction coefficient.

Two measuring targets which are not illustrated are moved or rotated at a constant velocity (step 101). Analog signals Sa and Sb corresponding to a relative displacement are detected by the sensor signal detection section (step 102). The two phase analog signals are converted into digital data by A/D converter 1 (step 103). Then, position data $\theta_0$ is calculated by position data calculator 2 (step 104). Next, the position error data included in the position data is encoded by Fourier transform in an error-correction parameter acquiring section 3, and G cos and G sin of the correction coefficient is calculated (step 105). In the next step, the correction coefficient is stored in a first memory 4 (step 106). So far, the operation generating the correction coefficient is finished. Herein after, a detailed operation of the encoding process will be described.

Figure 4:
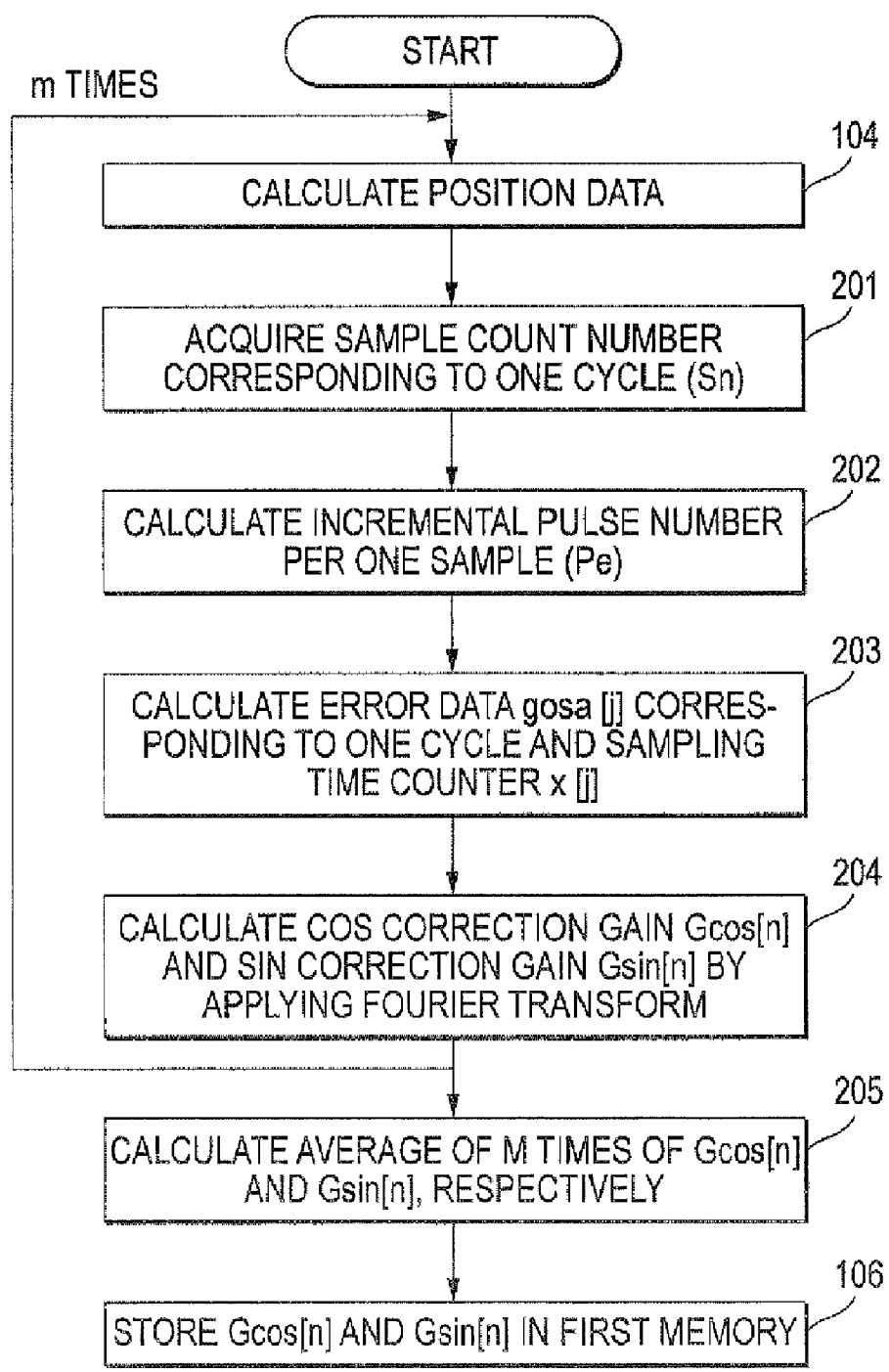
FIG. 4 is a flowchart illustrating a detailed operation of an encoding process.
Figure 5:
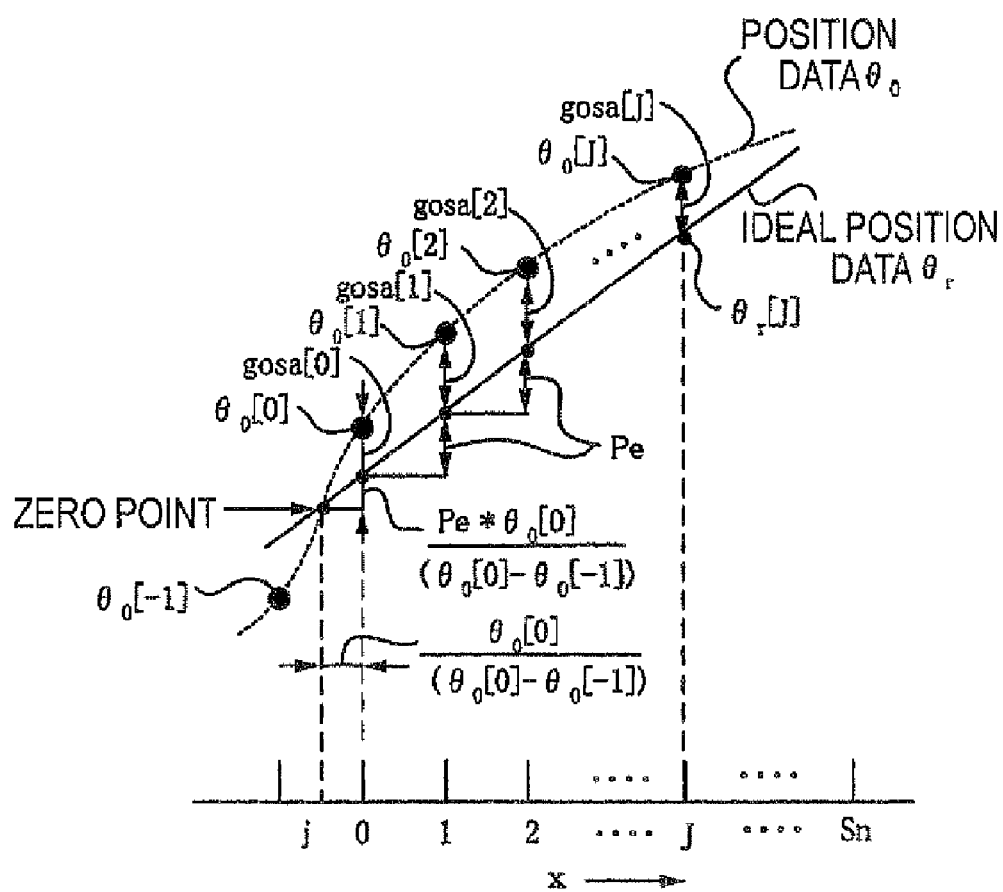
FIG. 5 is a graph illustrating a correlation between position data and error data.

FIG. 4 is a flowchart illustrating a detailed operation of an encoding process. FIG. 5 is a graph illustrating a correlation between position data $\theta_0$ [j] and error data gosa [j].

First, two measuring targets which are not illustrated are moved or rotated at a constant velocity. The position data $\theta_0$ calculated by the step 104 is sampled at stated periods. Then, the number of sample counts Sn corresponding to one period is obtained when the one period is set in the range from a trigger which is defined as a moment passing a zero point of the position data $\theta_0$ to a moment passing the next zero point (step 201).

Second, an incremental pulse number per one sampling count Pe is calculated by dividing one period partition number Dn of the position data by the number of sample counts Sn (step 202).

$$Pe = Dn/Sn$$

Third, ideal position data $\theta_r$ [j] which can be obtained from a pulse counts value of a regular frequency in sampling point x [j] is subtracted from the position data $\theta_0$ [j] in each sampling point. Therefore, the error data gosa [j] is obtained (step 203).

In actual situation, the position data $\theta_0$ [j] is defined as position data $\theta_0$ [0] which is position data at the moment of a sampling right after detecting the zero point when count is zero. Therefore, the error data gosa [j] and a sampling time counter (data of a time axis) x [j] are expressed as follows.

$$gosa[j] = \theta_0[j] - \{\{Pe*j\} - Pe*\theta_0[0]/(\theta_0[0] - \theta_0[-1])$$

$$x[j] = j + \theta_0[0]/(\theta_0[0] - \theta_0[-1])$$

(j: 0 to Sn)

Fourth, the error data is divided into components of COS and SIN by using the Fourier transform, and G cos [n] and G sin [n] which are respective coefficients thereof are calculated (step 204). Then, the coefficients are stored in the first memory 4 in the step 106. Calculation of the G cos [n] and G sin [n] may be normalized by performing the plural number of the operation (step 205). 'n' represents an order number of high frequency.

(Correction Table Preparing Operation)

Hereinafter, the operation preparing the correction table will be described.

Figure 6:
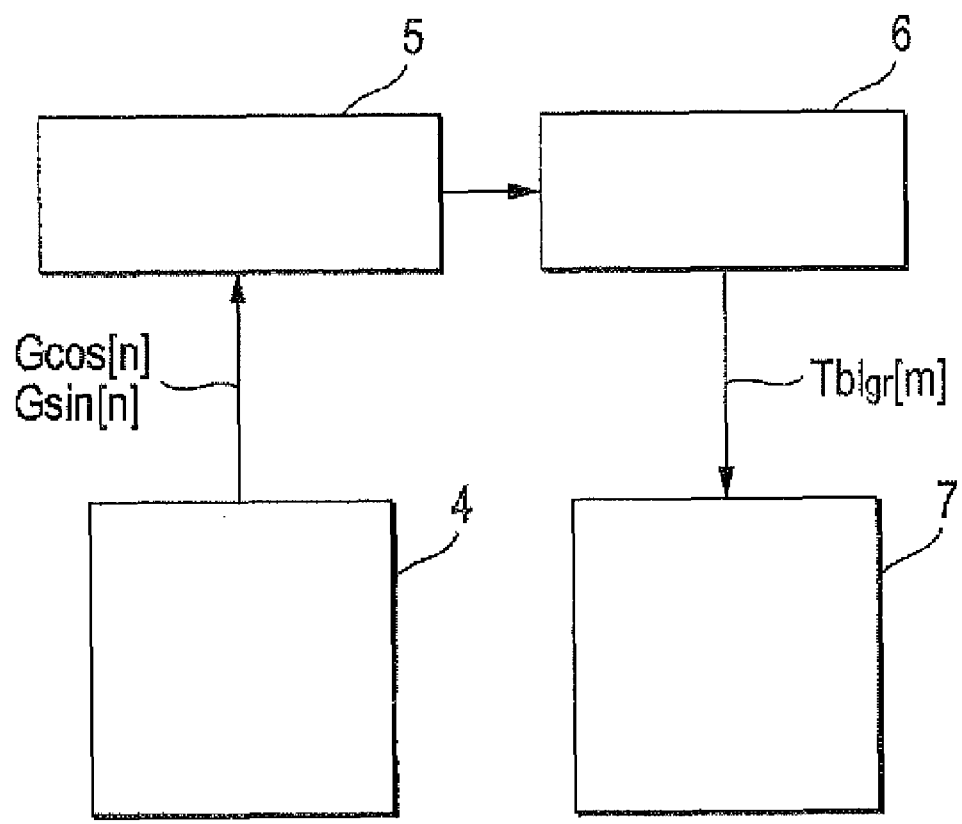
FIG. 6 is a block diagram illustrating an operation preparing a correction table.

FIG. 6 is a block diagram illustrating the operation preparing the correction table. FIG. 6 is a drawing extracting a part relating to the operation preparing the correction table from the block diagram of the signal processing device in FIG. 1.

When a power source of the encoder signal processing device is applied, the error-containing position data preparing section 5 reads out the correction coefficients G cos [n] and G sin [n] which are stored in the first memory 4. Then, the position error data is decoded, and the error-containing position data is prepared on the basis of the decoded error data. The error-correction position table preparing section 6 prepares the correction table which corresponds to the correction data for correcting the error-containing position data and the position data, and stores the correction table in the second memory 7.

Herein, a detailed operation preparing the correction table will be described.

Figure 7:
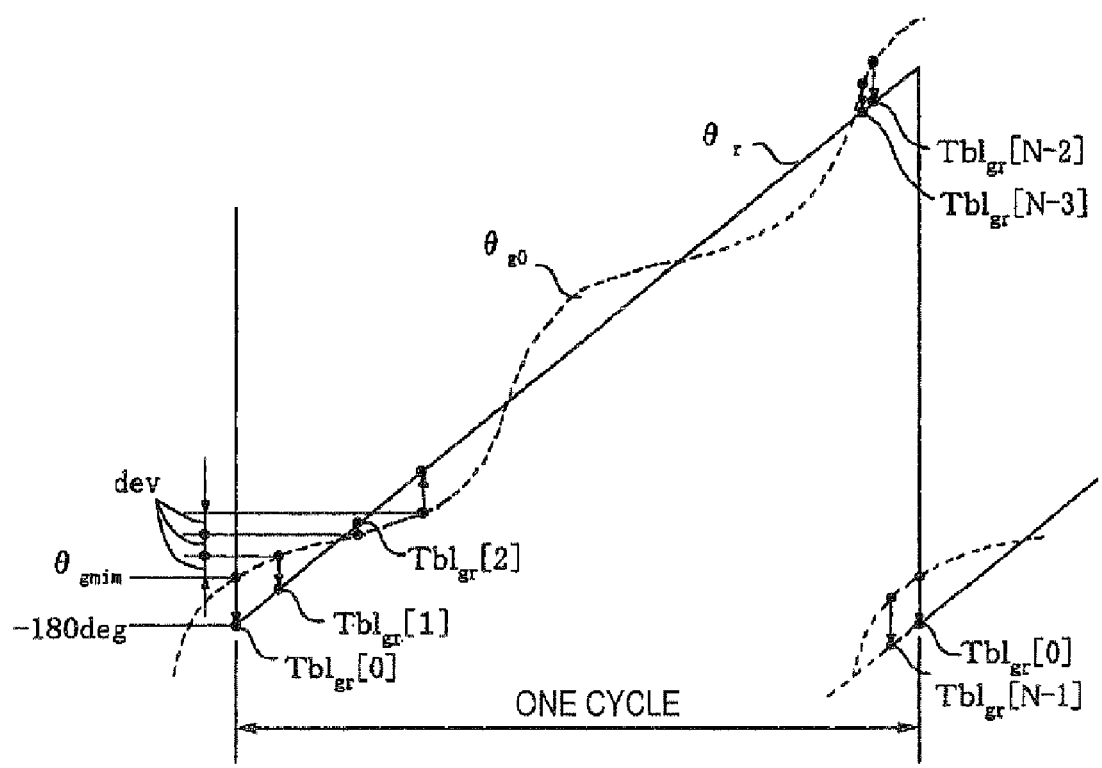
FIG. 7 is a graph illustrating data of the correction table.

FIG. 7 is a graph illustrating data of the correction table.

In the drawing, $\theta_r$ is the ideal position data which is the correction data. $\theta_{g0}$ is the error-containing position data. Dev is a separation pitch which divides the error-containing position data corresponding to one period by N.

The error-containing position data preparing section 5 reads and judges the correction coefficients G cos [n] and G sin [n]. The section prepares the error-containing position data $\theta_{g0}$ with respect to the ideal position data $\theta_r$ by performing as follows.

$$\theta_{g0} = \theta_r + \Sigma\{(G\cos[n]*COS(n\theta_0) + G\sin[n]*SIN(n\theta_0)\}$$

Next, comparing the ideal position data $\theta_r$ with the error-containing position data $\theta_{g0}$, table data $Tbl_{gr}$ [m] (m: 0 to N−1) of the ideal position data $\theta_r$ is prepared by the error-correction position table preparing section 6 with respect to the error-containing position data $\theta_{g0}$. In the embodiment, the ideal position data $\theta_r$ is related to the error-containing position data $\theta_{g0}$. When the ideal position data $\theta_r$ is −180 deg, the table data is defined as $Tbl_{gr}$ [0]. At this time, the error-containing position $\theta_{g0}$ is defined as a position containing minimum errors $\theta_{gmin}$.

(Correcting Operation)

Hereinafter, a step of the correcting operation using the correction table will be described.

Figure 8:
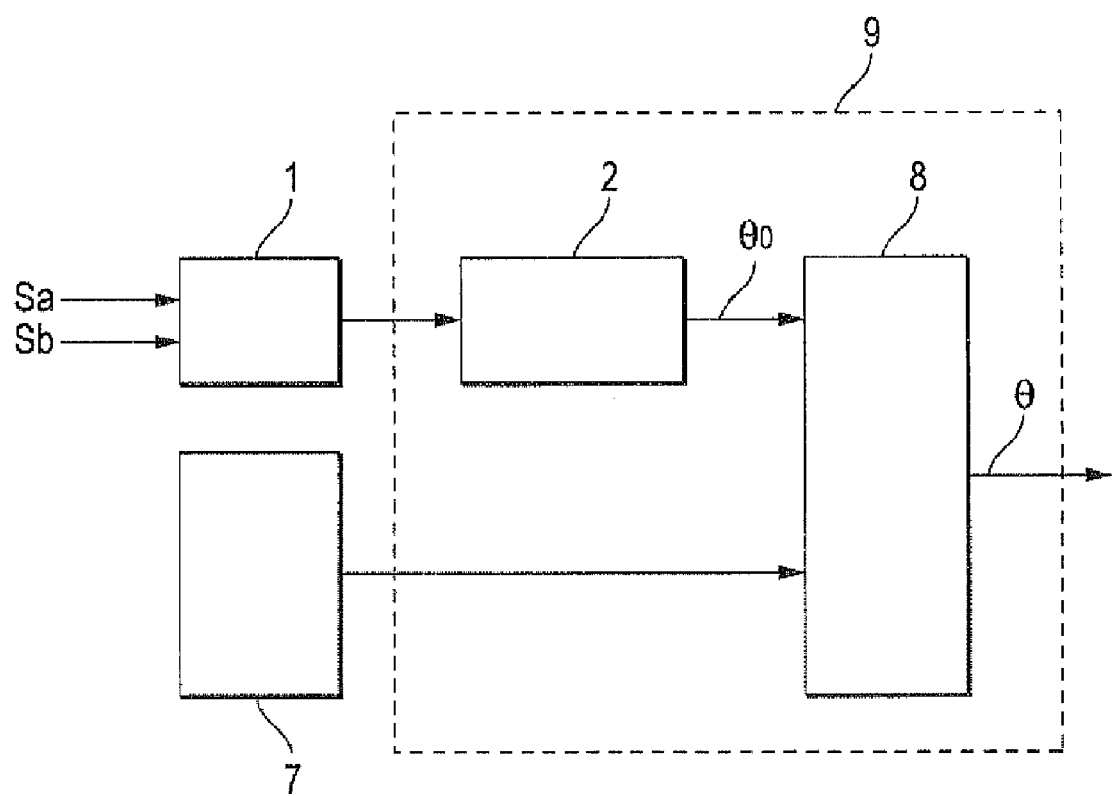
FIG. 8 is a block diagram illustrating a correcting operation.

FIG. 8 is a block diagram illustrating a correcting operation. FIG. 8 is a drawing extracting a part relating to the correcting operation from the block diagram of the signal processing device in FIG. 1.

When a drive of the signal processing device starts, an analog signals Sa and Sb corresponding to a relative displacement are detected by the sensor signal detection section. The two phase analog signals are converted into digital data by A/D converter 1. Then, position data $\theta_0$ is calculated by position data calculator 2. Next, the error correcting section 8 reads out the position data $\theta_0$, and gives an actual output of position data $\theta$ which is corrected position data with reference to the correction table of the second memory 7 by the use of the position data $\theta_0$ (an operation referring to the correction table).

Herein, the operation referring to the correction table mentioned above will be described.

First, when the one period partition number Dn which is resolving power of the position data $\theta_0$ is the same as the table partition number N of the correction table, a table reference position $\theta_{tbl}$ corresponding to $\theta_0$ is derived from the calculated position data $\theta_0$. Therefore, data $Tbl_{gr}[\theta_{tbl}]$ of the reference position $\theta_{tbl}$ becomes the actual position data $\theta$.

Specifically, the actual position data $\theta$ is given by $$\theta = Tbl_{gr}[\theta_{tbl}]$$

where the table reference position $\theta_{tbl}$ is obtained by subtracting the minimum error-containing position $\theta_{g\_min}$ from the calculated position data $\theta_0$ as follows.

$$\theta_{tbl} = \theta_0 - \theta_{gmin} (\theta_{tbl} : -180 \text{ deg to } 180 \text{ deg})$$

Next, in the case that the table partition number N is smaller than the one cycle partition number Dn, the error-correction position table $Tbl_{gr}[m]$ is referred to the table reference position $\theta_{tbl}$. Hence, the position data $\theta$ can be obtained by linear interpolation.

Namely, assuming that the quotient is 'k' and the remainder is 'mod' when $\theta_{tbl}$ is divided by dev(Dn/N), the actual position data $\theta$ is given by $$\theta = Tbl_{gr}[k] + (Tbl_{gr}[k+1] - Tbl_{gr}[k])/\text{dev}*\text{mod}$$

The table partition number N is set in consideration of a harmonic wave order and RAM capacity. The position error data is prepared as the correction data, and the error data corresponding to the position data $\theta_0$ is subtracted from the position data in the correction operation. Then, the actual position data $\theta$ may be outputted.

Second Embodiment

Figure 9:
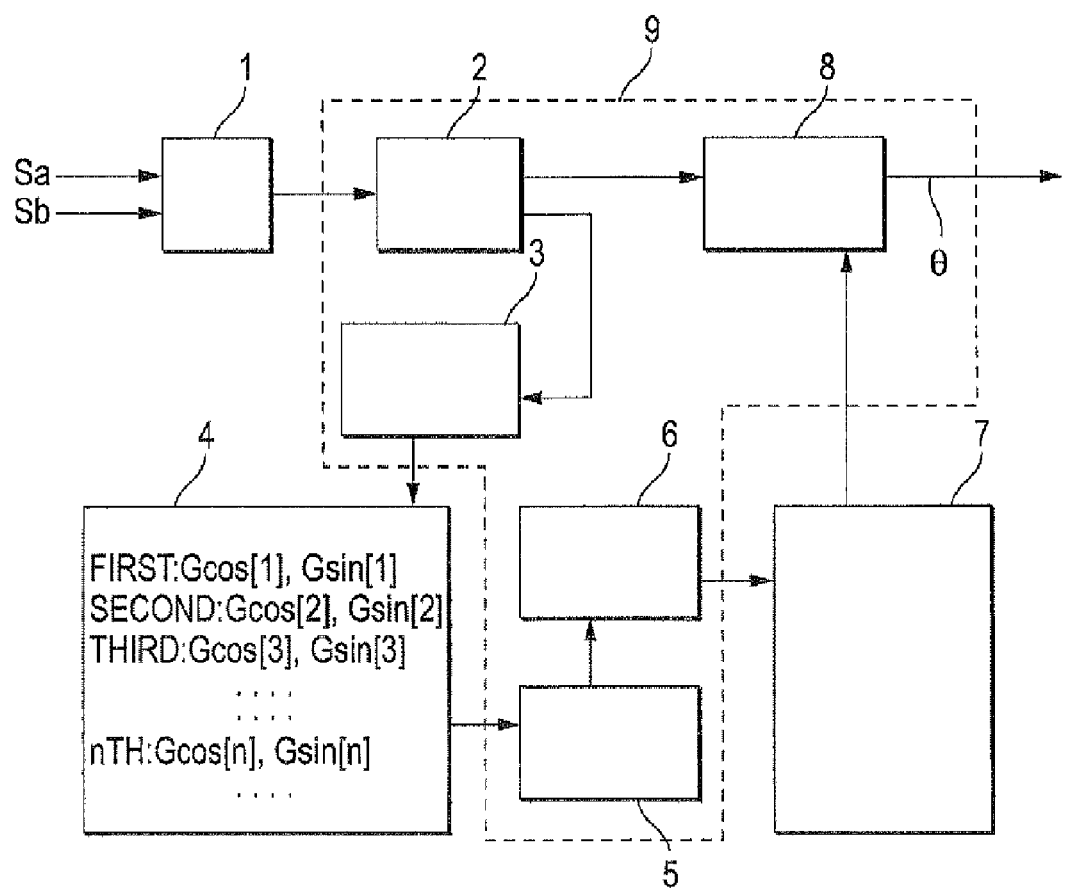
FIG. 9 is a block diagram illustrating an operation preparing a correction table in a second embodiment of the invention.

FIG. 9 is a block diagram illustrating an operation preparing a correction table in a second embodiment of the invention.

In FIG. 9, 3 indicates an error-correction parameter acquiring section. 4 indicates a first memory. 5 indicates an error-containing position data preparing section.

The different point of the embodiment relative to the first embodiment is, the position error correction parameter is stored as a configuration of G cos [n] and G sin [n] which are amplitudes of plural-order COS and SIN components in the first embodiment, respectively, but the parameter is stored as a configuration of G cos [n] and a phase d$\theta$ [n] thereof in the second embodiment. It is possible to be stored as G sin [n] and a phase d$\theta$ [n] thereof instead of the G cos [n] and the phase d$\theta$ [n] thereof.

Hereinafter, an operation of the embodiment will be described.

An error data gosa [j] and a sampling time counter at this moment (time axis data x [j]) is obtained in the same manner as the error-correction parameter acquiring section 3 of the first embodiment in the error-correction parameter acquiring section 3 of the second embodiment. Herein, the error data is divided into COS or SIN component by applying the Fourier transform. Then, the COS component amplitude G cos [n] and the phase d$\theta$ [n] thereof and the SIN component amplitude G sin [n] and the phase d$\theta$ [n] thereof is calculated, and stored in the first memory 4. The error-containing position data preparing section 5 decodes the parameter stored as the configuration of the amplitude and phase.

As mentioned above, the error waveform can be expressed as one curve of COS or SIN in the embodiment. As a result, a fine adjustment of the correction parameter can be conveniently performed.

Third Embodiment

Figure 10:
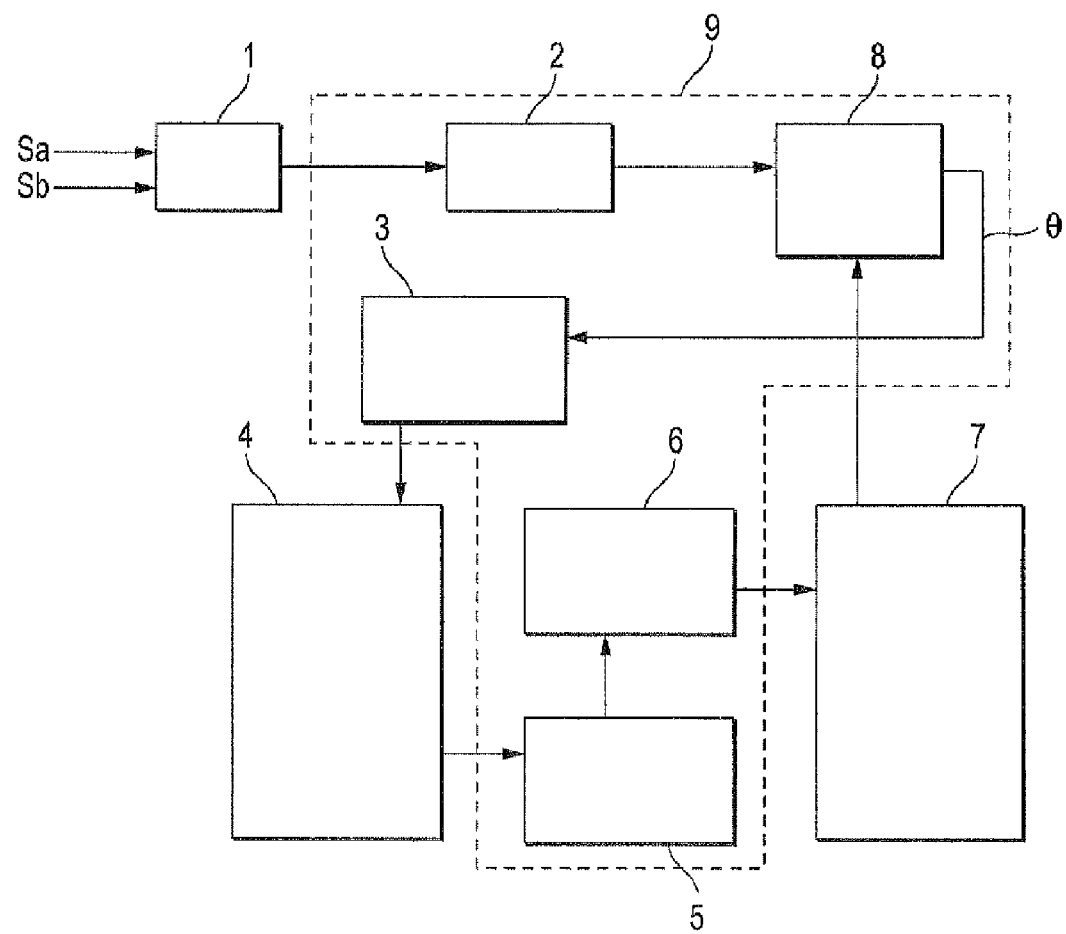
FIG. 10 is a block diagram illustrating an operation generating a correction coefficient in a third embodiment of the invention.

FIG. 10 is a block diagram illustrating an operation generating a correction coefficient in a third embodiment of the invention.

The different points of the embodiment relative to the first embodiment are, the block diagram (FIG. 2) of the correction coefficient preparing operation includes the A/D converter 1, the position data calculator 2, the error-correction parameter acquiring section 3 and the first memory 4 in the first embodiment. However, in the third embodiment, an error-containing position data preparing section 5, an error-correction position table preparing section 6, a second memory 7 and a correcting section 8 are further included therein. Additionally, in the first embodiment, the output of the position data calculator 2 is connected to the error-correction parameter acquiring section 3. However, in the third embodiment, an output $\theta$ of the error correcting section 8 is connected to the error-correction parameter acquiring section 3.

Next, it will be described about an operation of the embodiment.

Figure 11:
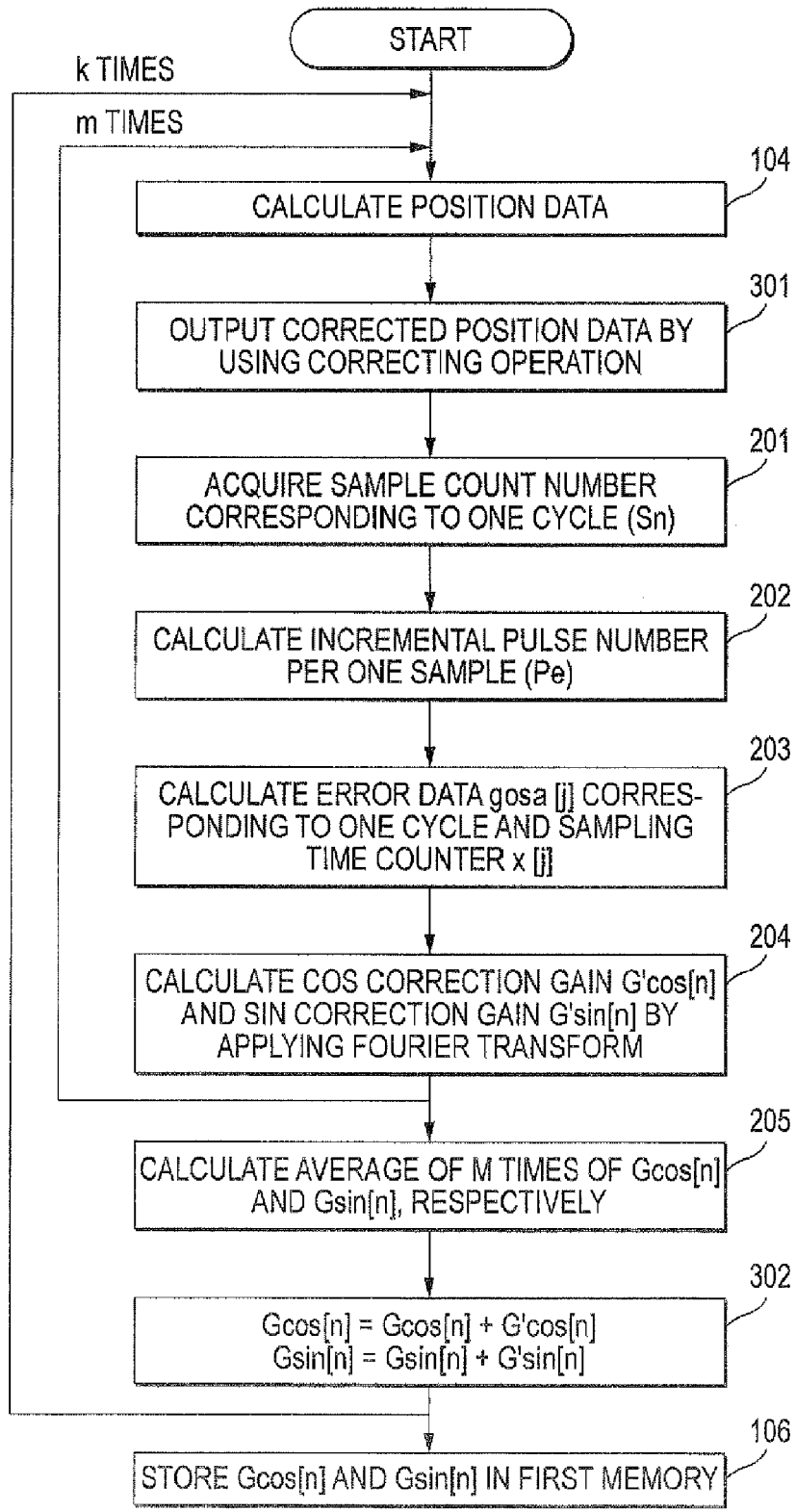
FIG. 11 is a flowchart illustrating an operation of the third embodiment of the invention.

FIG. 11 is a flowchart illustrating an operation of the embodiment.

In the drawing, a step 301 performs that the calculated position data $\theta_0$ of the step 104 is read out, and a correction table of the second memory 7 is referred to the position data. Then, the step performs a correcting operation which gives an output of the corrected position data $\theta$. Additionally, The step 302 adds a corrected part G' cos [n] and G' sin [n] obtained by the current calculation to the correction coefficient G cos [n] and G sin [n] obtained by the last calculation, and newly prepares and updates G cos [n] and G sin [n].

There are a different points between the flowchart (FIG. 11) of the embodiment and the flowchart of the first embodiment in that the steps 301 and 302 are added, and a loop which repeats plural times the operations from the step 104 to the step 302 are added.

To clarify, in the first embodiment, the error-correction parameter acquiring section 3 generates the correction coefficient from the output signal of the position data calculator 2. However, in the embodiment, the corrected position data in the step 301, that is, an output signal $\theta$ of the error correcting section 8 is used for generating the correction coefficient. Also, repeating plural times the operations from the step 104 to the step 302, the correction coefficient is updated.

The repeating may be kept until detecting the position error data which is a predetermined value or less, and may be previously determined so that the position error data sufficiently becomes small.

In the embodiment as mentioned above, the correction table preparing operation and the correcting operation are added to the correction coefficient generating operation. The correction coefficient is generated by the corrected position data, and the last generated correction coefficient is updated. Therefore, performing the operations plural times, the correction coefficient having higher accuracy can be generated, and the position detection data having higher accuracy can be obtained.

INDUSTRIAL APPLICABILITY

The invention is possible to apply encoder position detection error corrections of all types having periodic errors which are reproduced irrespective of types such as magnetic, optic, rotary, and direct acting type.

The invention claimed is:
1. An encoder signal processing device comprising:
 an A/D converter converting a periodic analog signal, which is obtained from a sensor signal detecting section, into digital data, with relative displacement of two objects;
 a memory storing position detection error information; and a computing unit including a position data calculator which calculates position data from the digital data and an error correcting section which corrects the position data based on the position detection error information, wherein the memory includes:
a first memory encoding position error data which is included in the position data by the use of the computing unit and storing a correction coefficient; and
a second memory decoding the position error data on the basis of the correction coefficient by the use of the computing unit and storing correction data for correcting the position data and error-containing position data generated on the basis of the encoded position error data.

2. The encoder signal processing device according to claim 1, wherein
the first memory includes a non volatile memory, and
the second memory includes a volatile memory.

3. The encoder signal processing device according to the claim 1, wherein
the calculator includes:
an error-correction parameter acquiring section calculating the correction coefficient;
an error-containing position data preparing section preparing the error-containing position data based on the encoded position error data; and
an error-correction position table preparing section preparing a table of correction data corresponding to the error-containing position data.

4. A signal processing method of an encoder signal processing device, the method comprising:
a position error storing step of
moving two objects relative to each other at a constant velocity,
converting a periodic analog signal generated in accordance with relative displacement into digital data,
calculating position data from the digital data,
calculating position error data from the position data, and
storing the position error data; and
a position error correcting step of correcting the position data on the basis of the stored position error data,
wherein
the position error data stored in the position error storing step is obtained by
generating a correction coefficient encoding the calculated position error data and
storing the correction coefficient in a first memory, and
the position error correcting step includes
reading and decoding the correction coefficient stored in the first memory,
calculating error-containing position data from the decoded position error data,
preparing a correction table in which the error-containing position data is correlated with correction data,
storing the correction table in a second memory,
converting a periodic analog signal generated with displacement into digital data at the time of detecting the relative displacement of the two objects,
calculating position data from the digital data,
reading the correction data stored in the second memory,
correcting the position data by the use of the correction data, and
outputting the corrected position data.

5. The signal processing method of an encoder signal processing device according to claim 4, wherein
the position error data stored in the position error storing step is obtained by storing in the first memory a correction coefficient, which is obtained by repeating plural times steps of:
correcting the position data on the basis of the stored correction data,
calculating the position error data from the corrected position data,
generating the correction coefficient encoding the position error data,
storing the correction coefficient in the first memory,
reading and decoding the correction coefficient stored in the first memory,
calculating error-containing position data from the decoded position error data,
preparing a correction table in which the error-containing position data is correlated with correction data,
storing the correction table in the second memory,
correcting the position data on the basis of the correction data,
calculating the position error data from the corrected position data, and
updating the coefficient of the last time as the correction coefficient of the present time encoding the position error data.

6. The signal processing method according to claim 4, wherein
the correction coefficient includes:
an amplitude of a plural order COS component, and
an amplitude of a plural order SIN component processed by a Fourier transform.

7. The signal processing method of an encoder signal processing device according to claim 4, wherein
the correction coefficient includes:
an amplitude and a phase of a plural order COS or SIN component processed by a Fourier transform.

8. The signal processing method according to claim 4, wherein
the correction data includes the decoded position error data,
the position error data corresponding to the position data is obtained from the correction table, and
the corrected position data obtained by subtracting the position error data from the position data is outputted.

9. The signal processing method according to claim 4, wherein
the correction data includes ideal position data,
the ideal position data corresponding to the position data is obtained from the correction table, and
the corrected position data is outputted by outputting the ideal position data.

10. The signal processing method of an encoder signal processing device according to claim 4, wherein
a feedback velocity controlled system is configured by the use of the corrected position data, and
the two objects are made to move relative to each other at a constant velocity.

11. The signal processing method of an encoder signal processing device according to claim 4, wherein
one of the two objects displaced relative to each other is mechanically connected to a moving object which is controlled at a constant velocity, and
the two objects are made to move relative to each other at a constant velocity.

* * * * *